US008643817B2

(12) United States Patent
Cho et al.

(10) Patent No.: US 8,643,817 B2
(45) Date of Patent: Feb. 4, 2014

(54) LATERAL ELECTRIC FIELD DISPLAY PANEL AND DISPLAY APPARATUS HAVING THE SAME

(75) Inventors: Se Hyoung Cho, Seoul (KR); Woo-Sung Sohn, Seoul (KR); Donggyu Kim, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 238 days.

(21) Appl. No.: 13/106,506

(22) Filed: May 12, 2011

(65) Prior Publication Data

US 2012/0081627 A1 Apr. 5, 2012

(30) Foreign Application Priority Data

Oct. 4, 2010 (KR) .................. 10-2010-0096503

(51) Int. Cl.
*G02F 1/1343* (2006.01)
*G09G 3/36* (2006.01)

(52) U.S. Cl.
USPC ................ 349/144; 349/39; 349/141; 345/92

(58) Field of Classification Search
USPC .................. 349/39, 141, 144; 345/92, 95, 96
See application file for complete search history.

(56) References Cited

U.S. PATENT DOCUMENTS

| 7,471,274 B2 | 12/2008 | Kim | |
|---|---|---|---|
| 2005/0001808 A1* | 1/2005 | Lee | ................................ 345/96 |
| 2008/0204616 A1* | 8/2008 | Fujita | .............................. 349/39 |
| 2008/0284708 A1 | 11/2008 | Oke et al. | |
| 2009/0040412 A1* | 2/2009 | Lee et al. | ........................ 349/48 |
| 2009/0153759 A1* | 6/2009 | Um et al. | ....................... 349/39 |

FOREIGN PATENT DOCUMENTS

| KR | 10-0810595 | 2/2008 |
|---|---|---|
| KR | 10-2009-0130610 | 12/2009 |
| KR | 10-0923673 | 5/2011 |

OTHER PUBLICATIONS

English Abstract for Publication No. 10-2007-0118417 (for 10-0810595).
English Abstract for Publication No. 10-2004-0013599 (for 10-0923673).
English Abstract for Publication No. 10-2009-0130610.

* cited by examiner

*Primary Examiner* — Michael Caley
(74) *Attorney, Agent, or Firm* — F. Chau & Associates, LLC (57) ABSTRACT

A display panel includes a first substrate including a plurality of pixels, a second substrate facing the first substrate, and a liquid crystal layer disposed between the first and second substrates. Each pixel includes a data line, a gate line insulated from the data line, a first signal line insulated from the data line, a second signal line insulated from the data line, a switching device connected to the data line and the gate line, a first pixel electrode connected to the switching device, and a second pixel electrode connected either the first signal line or the second signal line. The display panel displays an image according to an electric field generated between the first and second pixel electrodes.

18 Claims, 10 Drawing Sheets

LATERAL ELECTRIC FIELD DISPLAY PANEL AND DISPLAY APPARATUS HAVING THE SAME

CROSS-REFERENCE TO RELATED APPLICATION

This application claims priority to Korean Patent Application No. 10-2010-0096503 filed on Oct. 4, 2010, the contents of which are herein incorporated by reference in its entirety.

BACKGROUND

1. Technical Field

The present invention relates to a display panel and more particularly, the present invention relates to a display panel using a lateral electric field method and a display apparatus having the display panel.

2. Discussion of the Related Art

In general, a liquid crystal display includes a liquid crystal display panel having a first substrate, a second substrate, and a liquid crystal layer disposed between the first substrate and the second substrate.

A liquid crystal display may utilize a vertical electrical field method for applying an electric field to the liquid crystal layer. According to this method, an electric field is applied through electrodes arranged in each of the first substrate and the second substrate. Alternatively, a liquid crystal display may utilize a lateral electric field method in which an electric field is applied through electrodes arranged on one of the first substrate or the second substrate.

When compared to the vertical electric field method, the lateral electric field method requires that a relatively high voltage be applied to the liquid crystal layer.

SUMMARY

Exemplary embodiments of the present invention provide a display panel using a lateral electric field method and having a high display quality.

Exemplary embodiments of the present invention also provide a display apparatus having the display panel.

According to the exemplary embodiments, a display panel includes a first substrate having a plurality of pixels, a second substrate facing the first substrate, and a liquid crystal layer disposed between the first and second substrates.

Each of the plurality of pixels includes a data line, a gate line that is insulated from the data line over a region in which the gate line crosses the data line, a first signal line that is insulated from the data line over a region in which the first signal line crosses the data line and is spaced apart from the gate line, a second signal line that is insulated from the data line over a region in which the second signal line crosses the data line is and spaced apart from the gate line and the first signal line, a switching device connected to the data line and the gate line, a first pixel electrode connected to the switching device, and a second pixel electrode connected to either the first signal line or the second signal line.

The display panel displays an image according to an electric field generated between the first and second pixel electrodes formed on the liquid crystal layer.

According to exemplary embodiments, a display apparatus includes a driving circuit and a display panel.

The driving circuit receives an external signal and generates an image signal and a control signal. A display panel includes a plurality of pixels and receives the image signal and the control signal.

Each of the plurality of pixels includes a data line, a gate line that is insulated from the data line over a region in which the gate line crosses the data line, a first signal line that is insulated from the data line over a region in which the first signal line crosses the data line and is spaced apart from the gate line, a second signal line that is insulated from the data line over a region in which the second signal line crosses the data line and is spaced apart from the gate line and the first signal line, a switching device connected to the data line and the gate line, a first pixel electrode connected to the switching device, and a second pixel electrode connected to either the first signal line or the second signal line.

The display panel displays an image according to an electric field generated between the first and second pixel electrodes formed on the liquid crystal layer.

According to exemplary embodiments, a display panel includes a first substrate having a plurality of pixels, a second substrate facing the first substrate, and a liquid crystal layer disposed between the first and second substrates.

Each of the plurality of pixel includes a data line, a gate line that is insulated from the data line over a region in which the gate line crosses the data line, a signal line that is insulated from the data line over a region in which the signal line crosses the data line and is spaced apart from the gate line, a switching device connected to the data line and the gate line, a first pixel electrode connected to the switching device, and a second pixel electrode connected to the signal line.

The display panel displays an image according to an electric field generated between the first and second pixel electrodes formed on the liquid crystal layer.

According to the above, a voltage is effectively applied to the first and second pixel electrodes, and thus, a display panel may have a high aperture ratio and may be manufactured with relatively low cost.

BRIEF DESCRIPTION OF THE DRAWINGS

The above and other aspects of exemplary embodiments of the present invention are described below with reference to the accompanying drawings wherein.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout all figures.

Hereinafter, exemplary embodiments of the present invention will be explained in detail with reference to the accompanying drawings.

Figure 1:
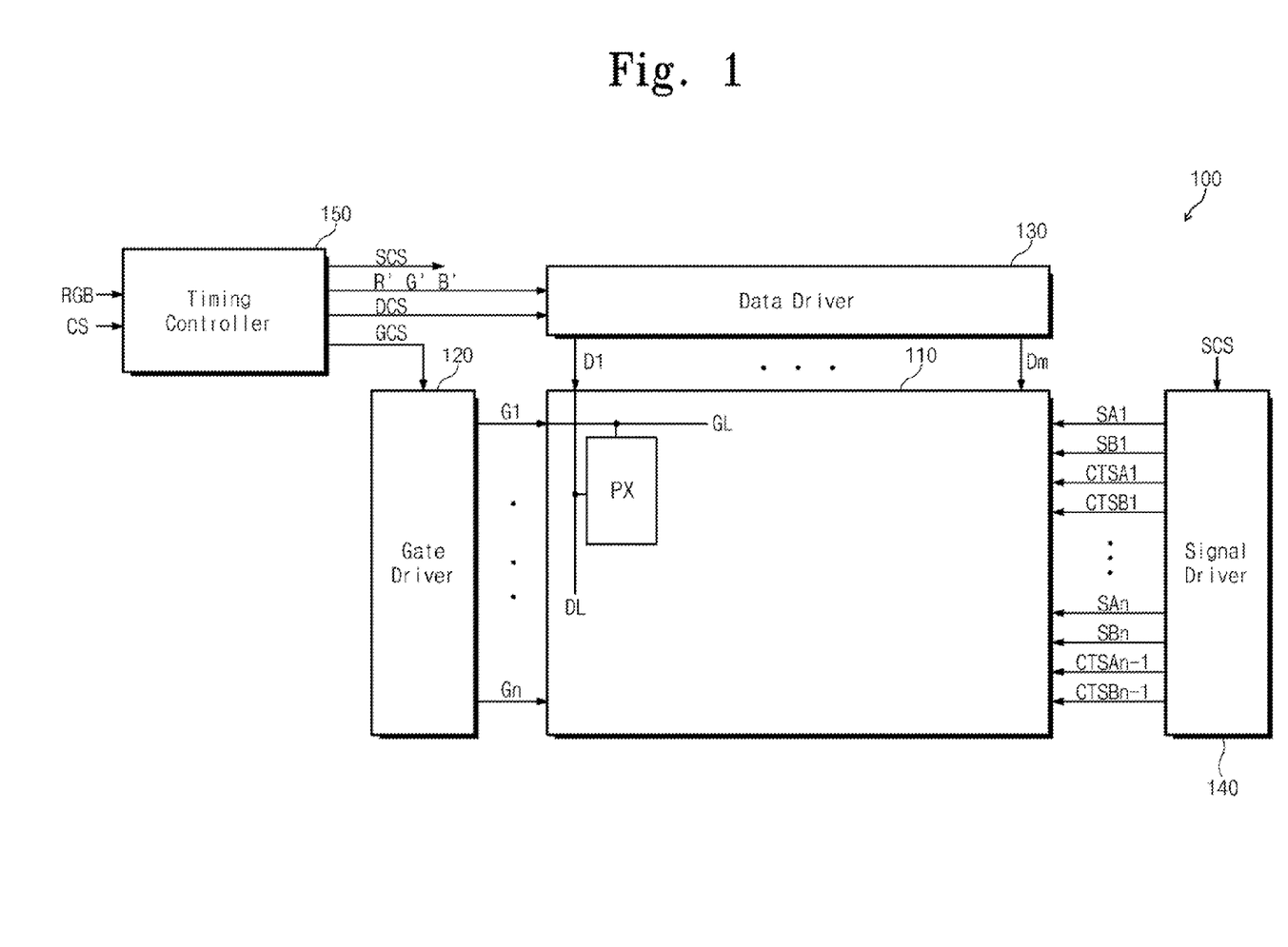
FIG. 1 is a block diagram showing a display apparatus according to an exemplary embodiment of the present invention.

FIG. 1 is a block diagram showing a display apparatus according to an exemplary embodiment of the present invention.

Referring to FIG. 1, a display apparatus 100 includes a display panel 110, a gate driver 120, a data driver 130, a signal driver 140, and a timing controller 150.

The timing controller 150 receives an image signal RGB and a control signal CS from the exterior of the display apparatus 100. The timing controller 150 converts a data format of the image signal RGB into a data format appropriate to an interface between the data driver 130 and the timing controller 150 and provides converted image signals R'G'B' to the data driver 130. The timing controller 150 provides a data control signal DCS, for example, a vertical synchronization signal V_sync, an output start signal, a horizontal start signal, a polarity inversion signal, etc., to the data driver 130.

The timing controller 150 provides a gate control signal GCS, for example, a vertical start signal, a vertical clock signal, a vertical clock bar signal, etc., to the gate driver 120. The timing controller 150 provides a signal control signal SCS, for example, a vertical start signal, a vertical clock signal, etc., to the signal driver 140.

The gate driver 120 sequentially outputs gate signals G1 through Gn in response to the gate control signal GCS applied from the timing controller 150.

The data driver 130 converts the image signals R'G'B into data voltages D1 through Dm in response to the data control signal DCS applied from the timing controller 150. The data driver 130 outputs the data voltages D1 through Dm and applies them to the display panel 110.

The signal driver 140 receives the signal control signal SCS from the timing controller 150 and sequentially outputs first line signals SA1 through SAn, second line signals SB1 through SBn, first switching signals CTSA1 through CTSAn−1, and second switching signals CTSB1 through CTSBn−1.

Figure 3:
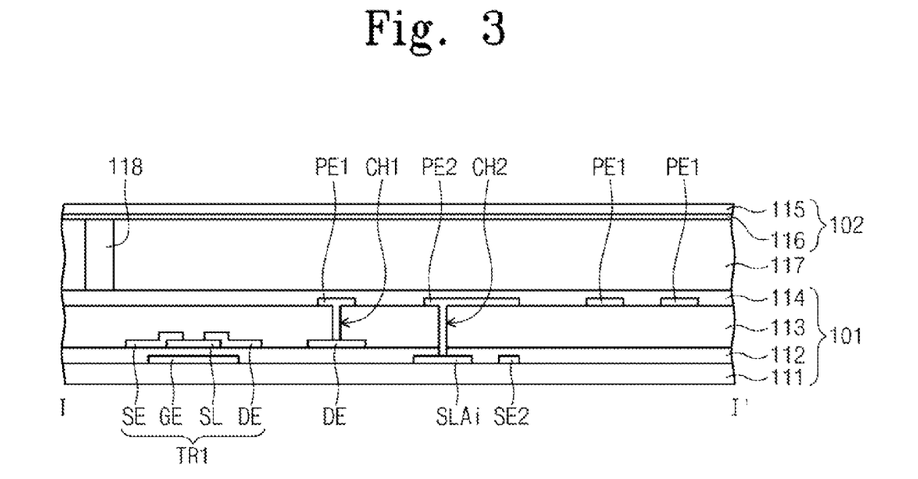
FIG. 3 is a cross-sectional view taken along a line I-I' of FIG. 2.

The display panel 110 includes a plurality of gate lines GL1 through GLn, a plurality of data lines DL1 through DLm crossing the gate lines GL1 through GLn, and pixels PX. The gate lines GL1 through GLn, the data lines DL1 through DLm, and the pixels PX may be arranged on a first substrate 101 (FIG. 3).

Since each of the pixels PX have the same structure and function, one pixel has been shown in FIG. 1 as a representative example, and detailed descriptions of the pixel will be described with reference to FIGS. 2 to 8.

Although not shown in FIG. 1, each pixel PX includes a thin film transistor and a liquid crystal capacitor. The thin film transistor includes a gate electrode connected to a corresponding gate line among the gate lines GL1 through GLn, a source electrode connected to a corresponding data line among the data lines DL1 through DLm, and a drain electrode connected to the liquid crystal capacitor.

The gate lines GL1 through GLn are connected to the gate driver 120 and the data lines DL1~DLm are connected to the data driver 130. The gate lines GL1 through GLn receive the gate signals G1 through Gn provided from the gate driver 120, and the data lines DL1 through DLm receive the data voltages D1 through Dm provided from the data driver 130.

The thin film transistor of each pixel PX is turned on in response to a gate signal provided through the corresponding gate line, and a data voltage applied through the corresponding data line is input to the source electrode of the turned-on thin film transistor and is output from the drain electrode of the turned-on thin film transistor.

Although not shown in the figures, a backlight unit may be positioned adjacent to the display panel 110 to provide light to the display panel 110.

Figure 2:
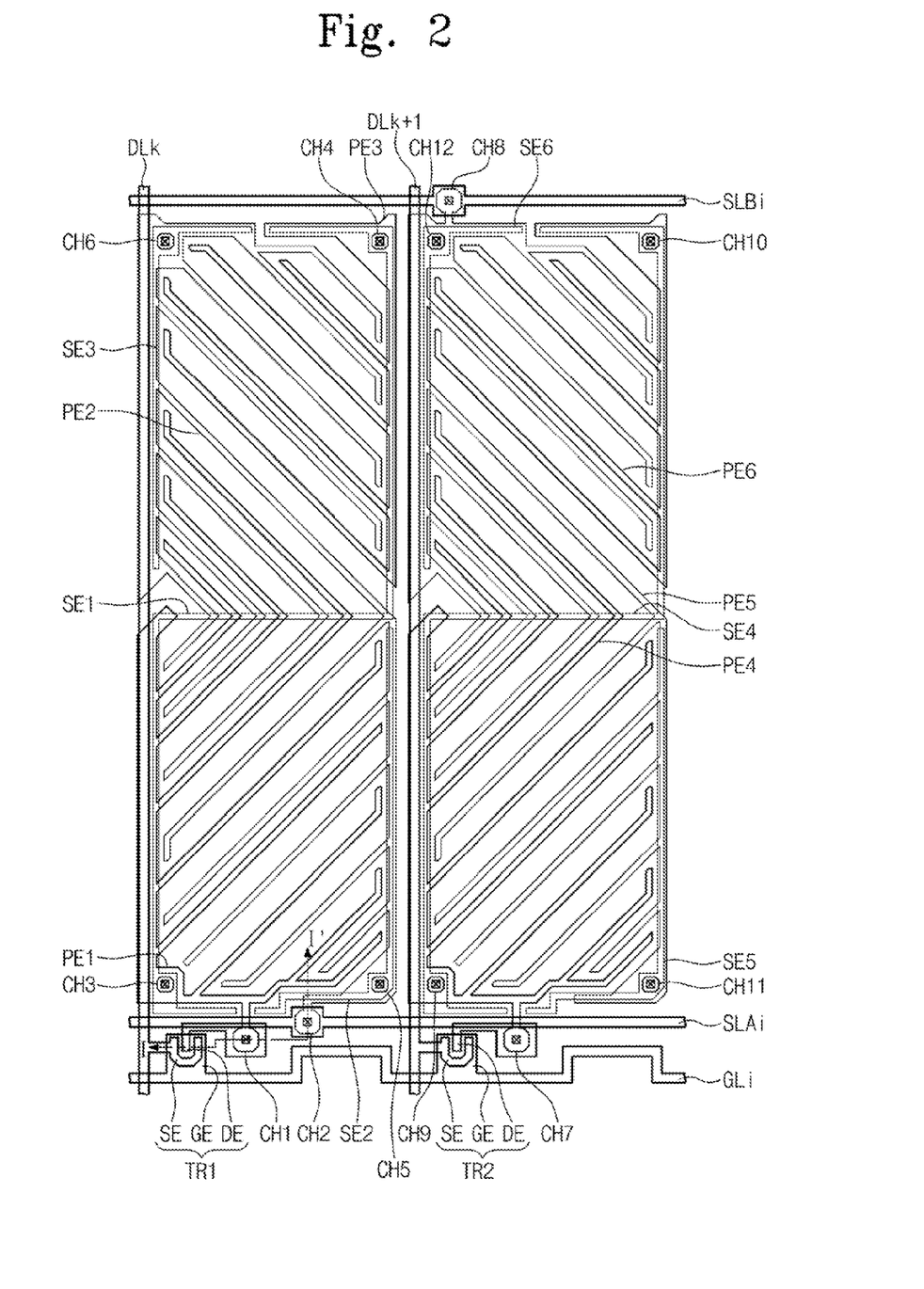
FIG. 2 is a plan view showing a display panel of FIG. 1.
Figure 4:
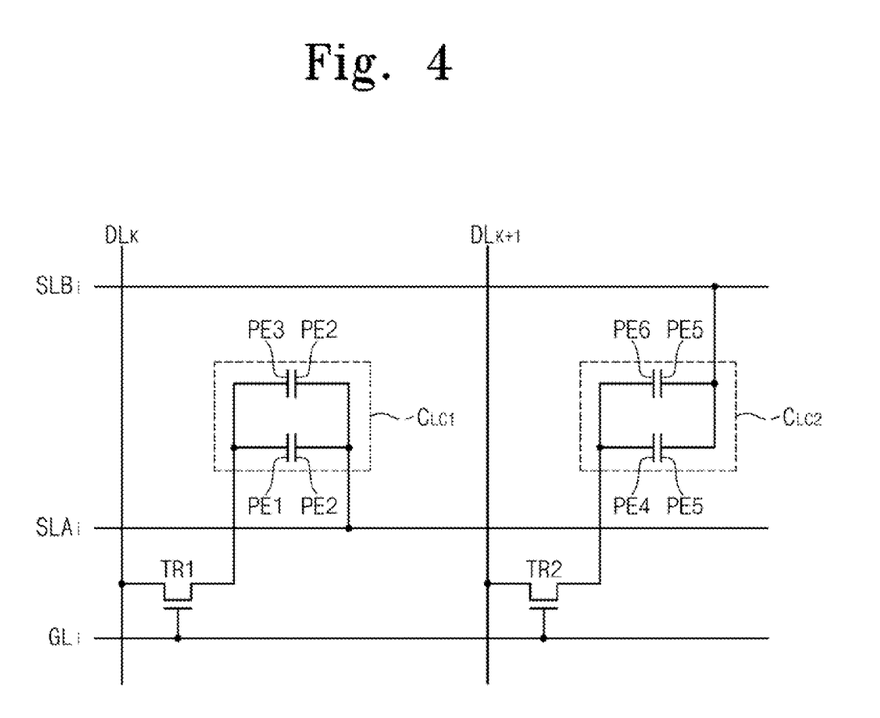
FIG. 4 is a circuit diagram corresponding to a display panel of FIG. 2.

FIG. 2 is a plan view showing the display panel of FIG. 1, FIG. 3 is a cross-sectional view taken along a line I-I' of FIG. 2, and FIG. 4 is a circuit diagram corresponding to the display panel of FIG. 2.

For the convenience of explanation, two pixel areas have been described as an example in FIG. 2, and it is to be understood that these the two pixel areas are repeatedly arranged in column and row directions in the display panel 110 to provide the desired number of pixel areas.

Referring to FIG. 2, the display panel 110 includes a gate line GLi extended in a first direction D1, a first data line DLk, and a second data line DLk+1 that are spaced apart from each other and extended in a second direction D2. The first and second data lines DLk and DLk+1 each cross the gate line GLi. A first signal line SLAi is spaced apart from the gate line GLi and extends in the first direction D1. A second signal line SLBi is spaced apart from the gate line GLi and the first signal line SLAi and extends in the first direction D1.

The display panel 110 further includes a first thin film transistor TR1 connected to the first data line DLk and the gate line GLi and a second thin film transistor TR2 connected to the second data line DLk+1 and the gate line GLi.

The first thin film transistor TR1 includes a gate electrode GE branched from the gate line GLi, a source electrode SE insulated from the gate electrode GE and branched from the first data line DLk, and a drain electrode DE spaced apart from the source electrode SE.

The second thin film transistor TR2 includes a gate electrode GE branched from the gate line GLi, a source electrode SE insulated from the gate electrode GE and branched from the second data line DLk+1, and a drain electrode DE spaced apart from the source electrode SE.

The drain electrode DE of the first thin film transistor TR1 is connected to a first pixel electrode PE1 through a first contact hole CH1 and the drain electrode DE of the second thin film transistor TR2 is connected to a fourth pixel electrode PE4 through a seventh contact hole CH7.

The first signal line SLAi is connected to a second pixel electrode PE2 through a second contact hole CH2. The second signal line SLBi is connected to a fifth pixel electrode PE5 through an eighth contact hole CH8. Thus, the second pixel electrode PE2 and the fifth pixel electrode PE5 of the pixels arranged in one row may be alternately connected to the first signal line SLAi or the second signal line SLBi. Also, the second pixel electrode PE2 of the pixels arranged in one column may be alternately connected to the first signal line SLAi or the second signal line SLBi.

Although not shown in FIG. 2, the connection of the second pixel electrodes or the fifth pixel electrodes arranged in one row or one column may be changed according to various embodiments.

The display panel 110 may further include a first shielding electrode SE1, a second shielding electrode SE2, a third shielding electrode SE3, a fourth shielding electrode SE4, a fifth shielding electrode SE5, and a sixth shielding electrode SE6. The shielding electrodes SE1 through SE5 may prevent the signals of the first and second data line DLk and DLk+1 from exerting influence on the liquid crystal layer 117.

The first shielding electrode SE1 is connected to the first pixel electrode PE1 through a third contact hole CH3, and the first shielding electrode SE1 is connected to a third pixel electrode PE3 through a fourth contact hole CH4. The second shielding electrode SE2 is connected to the second pixel electrode PE2 through a fifth contact hole CH5, and the third shielding electrode SE3 is connected to the second pixel electrode PE2 through a sixth contact hole CH6.

The first shielding electrode SE1 receives the same signal as the first and third pixel electrodes PE1 and PE3 and an electric field is prevented from being applied to the liquid crystal layer 117 due to the signals applied to the first and second data lines DLk and DLk+1 and the gate line GLi. The second and third shielding electrodes SE2 and SE3 receive the same signal as the second pixel electrode PE2 and an electric field is prevented from being applied to the liquid crystal layer 117 due to the signals applied to the first and second data lines DLk and DLk+1.

The fourth shielding electrode SE4 is connected to the fourth pixel electrode PE4 through a ninth contact hole CH9, and the fourth shielding electrode SE4 is connected to a sixth pixel electrode PE6 through a tenth contact hole CH10. The fifth shielding electrode SE5 is connected to the fifth pixel electrode PE5 through an eleventh contact hole CH11, and the sixth shielding electrode SE6 is connected to the fifth pixel electrode PE5 through a twelfth contact hole CH12.

The fourth shielding electrode SE4 receives the same signal as the fourth and sixth pixel electrodes PE4 and PE6 and an electric field is prevented from being applied to the liquid crystal layer 117 due to the signals applied to the second data line DLk+1 and the gate line GLi. The fifth and sixth shielding electrodes SE5 and SE6 receives the same signal as the fifth pixel electrode PE5 and an electric field is prevented from being applied to the liquid crystal layer 117 due to the signals applied to the second data line DLk+1 and the gate line GLi.

In FIG. 2, the first and third pixel electrodes PE1 and PE3 are connected to each other through the first shielding electrode SE1. The fourth and sixth pixel electrodes PE4 and PE6 are connected to each other through the fourth shielding electrode SE4. However, according to various embodiments, the pattern of the pixel electrodes may be changed from what is shown and described above. For example, the first pixel electrode PE1 may be directly connected to the third pixel electrode PE3 without using the first fielding electrode SE1, and, for example, the fourth pixel electrode PE4 may be directly connected to the sixth pixel electrode PE6 without using the fourth shielding electrode SE4. Similarly, the second, third, fifth, and sixth shielding electrodes SE2, SE3, SE5, and SE6 may be omitted according to various embodiments.

Referring to FIG. 3, the display panel 110 includes a first substrate 101, a second substrate 102 facing the first substrate 101, and the liquid crystal layer 117 disposed between the first and second substrates 101 and 102.

The first substrate 101 includes a first base substrate 111. A gate electrode GE and a first shielding electrode SE1 are arranged on the first base substrate 111. Although not shown in FIG. 3, the second to sixth shielding electrodes SE2 through SE6 are arranged on the first base substrate 111 in the same manner as the first shielding electrode SE1.

A gate insulating layer 112 is disposed on the first base substrate 111. The gate electrode GE, the first shielding electrode SE1, the source electrode SE, and the drain electrode DE are disposed on the gate insulating layer 112. A semiconductor layer SL is disposed between the gate electrode GE and the source and drain electrodes SE and DE. An organic protective layer 113 is disposed on the first thin film transistor TR1.

The first and second pixel electrodes PE1 and PE2 are disposed on the organic protective layer 113. A first alignment layer 114 is disposed on the organic protective layer 113 and the first and second pixel electrodes PE1 and PE2. Liquid crystal molecules of the liquid crystal layer 117 may be aligned in accordance with the first alignment layer 114.

The first pixel electrode PE1 is connected to the drain electrode DE through the first contact hole CH1 formed through the organic protective layer 113. The second pixel electrode PE2 is connected to the first signal line SLAi through the second contact hole CH2 formed through the organic protective layer 113 and the gate insulating layer 112.

A column spacer 118 is disposed between the first and second substrates 101 and 102 and maintains a uniform distance between the first and second substrates 101 and 102.

The second substrate 102 includes a second base substrate 115 and a second alignment layer 116 arranged under the second base substrate 115. Although not shown in the figures, the second substrate 102 may include a color filter, such as a red color filter, a green color filter, and/or a blue color filter.

Referring to FIG. 4, the drain electrode DE of the thin film transistor TR1 is connected to the first and third pixel electrodes PE1 and PE3. The drain electrode DE of the second thin film transistor TR2 is connected to the fourth and sixth pixel electrodes PE4 and PE6.

The second pixel electrode PE2 is connected to the first signal line SLAi and forms a first liquid crystal capacitor $C_{LC1}$ using the first and third pixel electrodes PE1 and PE3 and the liquid crystal layer 117 as a dielectric substance. The fifth pixel electrode PE5 is connected to the second signal line SLBi and forms a second liquid crystal capacitor $C_{LC2}$ using the fourth and sixth pixel electrodes PE4 and PE6 and the liquid crystal layer 117 as a dielectric substance. Thus, the display panel 110 varies an orientation phase of liquid crystal molecules in the liquid crystal layer 117 according to a voltage applied to the first and second liquid crystal capacitors $C_{LC1}$ and $C_{LC2}$ and displays a grayscale.

Figure 5:
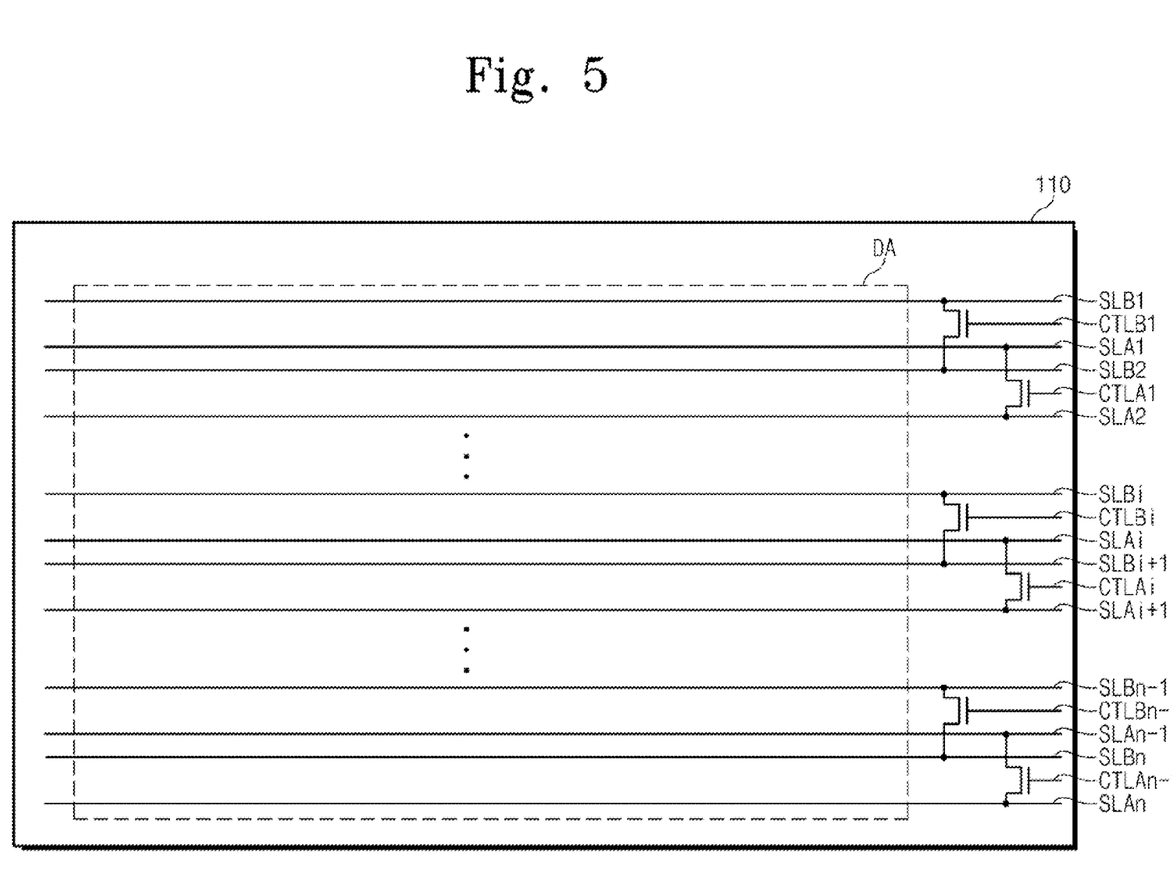
FIG. 5 is a circuit diagram showing a display panel of FIG. 1.

FIG. 5 is a circuit diagram showing the display panel of FIG. 1. Although not shown in FIG. 5, the display panel 110 includes pixel areas arranged in n rows and m columns. However, for the convenience of explanation, only the first signal lines SLA1 through SLAn, the second signal lines SLB1 through SLBn, the first switching devices CTA1 thorough CTAn−1, the second switching devices CTB1 through CTBn−1, first switching lines CTLA1 through CTLAn−1, and second switching lines CTLB1 through CTLBn−1 have been shown in FIG. 5.

The first signal lines SLA1 through SLAn respectively receive the first line signals SA1 through SAn, and the second signal lines SLB1 through SLBn respectively receive the second line signals SB1 though SBn.

First and second electrodes of each of the first switching devices CTA 1 through CTAn−1 are connected to between the two first signal lines adjacent to each other. First and second electrodes of each of the second switching devices CTB1 through CTBn−1 are connected to between the two second signal lines adjacent to each other. Third electrodes of the first switching devices CTA1 through CTAn−1 are respectively connected to the first switching lines CTLA1 through CTLAn−1, and the first switching devices CTA1 through CTAn−1 respectively receive the first switching signals CTSA1 through CTSAn−1. In addition, third electrodes of the second switching devices CTB1 through CTBn−1 are respectively connected to the second switching lines CTLB1 through CTLBn−1, and the second switching devices CTB1 through CTBn−1 respectively receive the second switching signals CTSB1 thorough CTSBn−1.

The first switching devices CTA1 through CTAn−1 connect two first signal lines adjacent to each other. The second switching devices CTB1 through CTBn−1 connect two second signal lines adjacent to each other. However, according to various embodiments, the first switching device connecting two first signal lines respectively included in two pixel rows and the second switching device connecting two second signal lines respectively included in the two pixel rows may be connected to the same switching line to receive the same signal.

In FIG. 5, the first and second switching devices CTA1 through CTAn–1 and CTB1 through CTBn–1 are arranged in a non-display area outside the display area DA in which the pixels PX are arranged. However, an arrangement position of the first and second switching devices CTA1 through CTAn–1 and CTB1 through CTBn–1 may be changed according to various embodiments.

A voltage applied to the first and second signal lines SLA1 through SLAn and SLB1 through SLBn is influenced by voltages applied to the data lines DL1 through DLm, the gate lines GL1 through GLn, and the first to sixth pixel electrodes PE1 through PE6. However, the stability of the voltage applied to the first and second signal lines SLA1 through SLAn and SLB1 through SLBn may be increased by connecting the first signal lines SLA1 through SLAn to each other and connecting the second signal lines SLB1 through SLBn to each other.

More detailed descriptions of the signals applied to the first signal lines SLA1 through SLAn, the second signal lines SLB1 through SLBn, the first switching lines CTLA1 through CTLAn–1, and the second switching lines CTLB1 through CTLBn–1 are described below with reference to FIG. 8.

Figure 6:
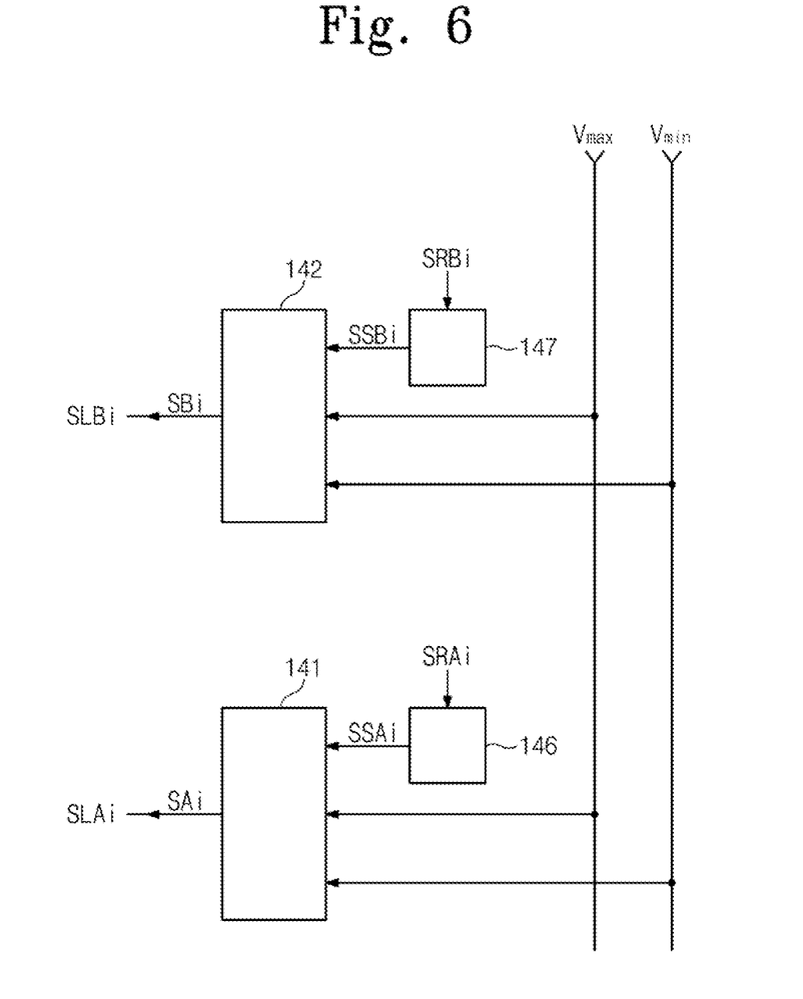
FIG. 6 is a block diagram showing a signal driver of FIG. 1.

FIG. 6 is a block diagram showing the signal driver of FIG. 1. Since the signal driver may have the same circuit configuration in every row, for the convenience of explanation, a circuit configuration of the signal driver according to an i-th pixel row will be described in FIG. 6.

The signal driver 140 includes a first voltage selection circuit 141 and a second voltage selection circuit 142. Each of the first and second voltage selection circuits 141 and 142 receives a first voltage Vmax corresponding to a maximum grayscale value of positive polarity with respect to a predetermined reference voltage and a second voltage Vmin corresponding to a maximum grayscale value of negative polarity with respect to the predetermined reference voltage. The first and second voltages Vmax and Vmin have different polarities from each other with respect to the predetermined reference voltage and have the same voltage level.

As an example, the first voltage Vmax may have a voltage level of about 15V, the second voltage Vmin may have a voltage level of about 0V, and the predetermined reference voltage may have a voltage level of about 7.5V.

The first voltage selection circuit 141 receives a first selection signal SSAi to select either the first voltage Vmax or the second voltage Vmin according to the first selection signal SSAi and outputs the selected signal to an i-th first signal line SLAi corresponding to an i-th pixel row as a first line signal SAi. The second voltage selection circuit 142 receives a second selection signal SSBi to select either the first voltage Vmax or the second voltage Vmin according to the second selection signal SSBi and outputs the selected signal to an i-th second signal line SLBi corresponding to the i-th pixel row as a second line signal SBi.

A first stage 146 receives a first stage signal SRAi and outputs the first selection signal SSAi to the first voltage selection circuit 141. A second stage 147 receives a second stage signal SRBi and outputs the second selection signal SSBi to the second voltage selection circuit 142. Although not shown in FIG. 6, the first and second stage signals 146 and 147 may be directly applied from the timing controller 150, may be applied from a shift register included in the gate driver 120, or may be applied from a shift register in the signal driver 40.

Figure 7:
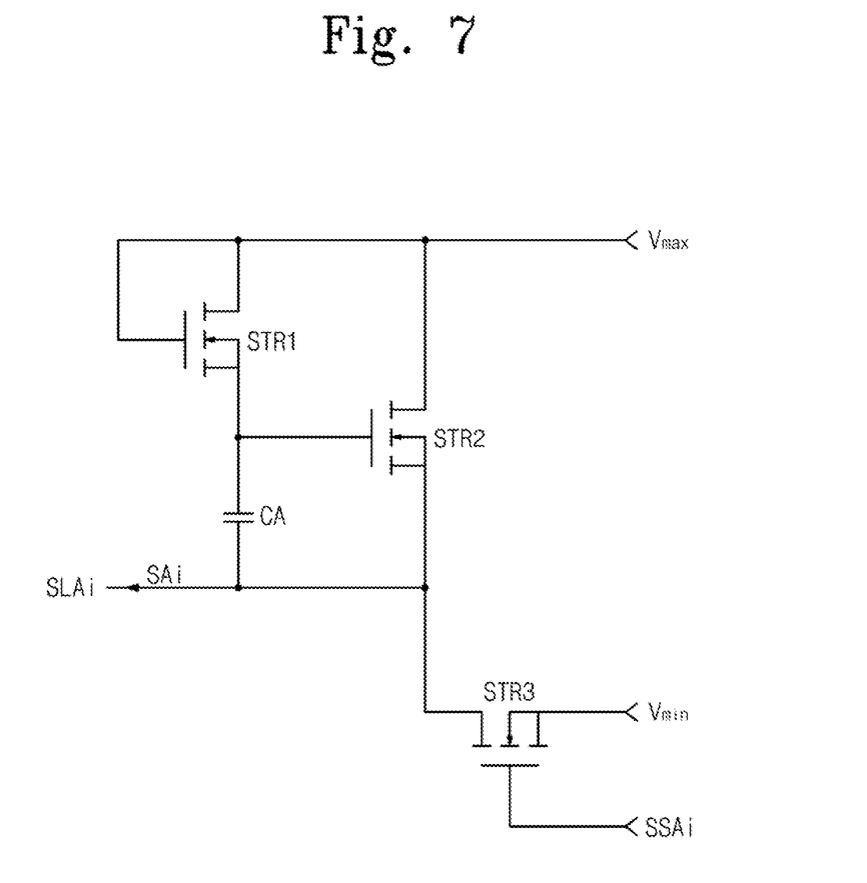
FIG. 7 is a circuit diagram showing a first voltage selection circuit of FIG. 6.

FIG. 7 is a circuit diagram showing the first voltage selection circuit of FIG. 6.

The first voltage selection circuit 141 includes a first selection transistor STR1, a second selection transistor STR2, a third selection transistor STR3, and a capacitor CA.

When a gate-on voltage is applied as the first stage signal SSAi to turn on the third selection transistor STR3, the second voltage Vmin is output to the first signal line SLAi as the first line signal SAi. Meanwhile, when a gate-off voltage is applied as the first stage signal SSAi to turn off the third selection transistor STR3, the first and second selection transistors STR1 and STR2 are turned on in response to the first voltage Vmax, and the first voltage Vmax is output to the first signal line SLAi as the first line signal SAi.

Figure 8:
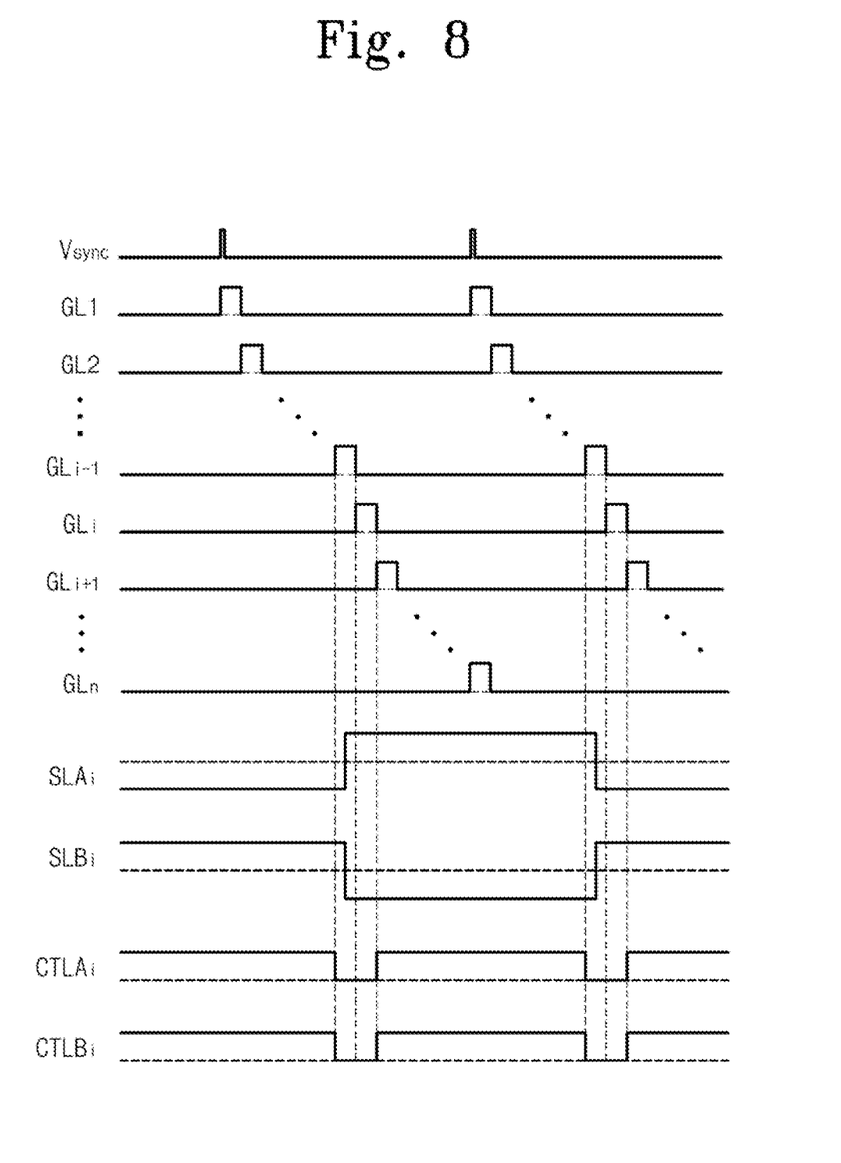
FIG. 8 is a timing diagram showing signals of FIG. 5.

FIG. 8 is a timing diagram showing the signals of FIG. 5.

Referring to FIG. 8, when a high period of a vertical synchronization signal V_sync indicating a start of one frame is input, a gate-on voltage is sequentially input to the gate lines GL1 through GLn. For the convenience of explanation, in an order from a top of the display panel 110, first, second, (i–1)-th, i-th, (i+1)-th, and n-th gate lines GL1, GL2, GLi–1, GLi, GLi+1, and GLn will be described with reference to FIG. 8.

Either the first voltage Vmax or the second voltage Vmin is repeatedly applied to the first signal lines SLA1 through SLAn at each frame. The i-th first signal line SLAi arranged corresponding to the i-th gate line GLi receives either the first voltage Vmax or the second voltage Vmin before the gate-on voltage is input to the i-th gate line GLi. The input voltage is maintained at a constant voltage level until a next gate-on voltage is input to the i-th gate line GLi.

In addition, the second signal lines SLB1 through SLBn repeatedly receive either the first voltage Vmax or the second voltage Vmin at each frame, and the voltage applied to the second signal lines SLB1 through SLBn is different from the voltage applied to the first signal lines SLA1 through SLAn.

As an example, when the first voltage Vmax is input to the first signal lines SLA1 through SLAn, the second voltage Vmin is input to the second signal lines SLB1 through SLBn respectively corresponding to the first signal lines SLA1 through SLAn. Then, when the second voltage Vmin is input to the first signal lines SLA1 through SLAn after the lapse of one frame period, the first voltage Vmax is input to the second signal lines SLB1 through SLBn corresponding to the first signal lines SLA1 through SLAn, respectively.

An i-th second signal line SLBi arranged corresponding to the i-th gate line GLi receives either the first voltage Vmax or the second voltage Vmin before the gate-on voltage is input to the i-th gate line GLi. The input voltage is maintained at a constant voltage level until a next gate-on voltage is applied to the i-th gate line GLi.

Each of the first switching lines CTLA1 through CTLAn–1 and the second switching lines CTLB1 through CTLBn–1 receives the gate-on voltage turning on the first and second switching devices CTA through CTAn–1 and CTB1 through CTBn–1 and connects two first signal lines adjacent to each other and two second signal lines adjacent to each other. However, since the signals applied to the first signal lines SLA1 through SLAn are sequentially inverted from the top of the display panel 110, the gate-off voltage that turns off the first switching device is input to the first switching device that connects the adjacent two first signal lines when the signals having different polarities are applied to the two first signal lines adjacent to each other.

Meanwhile, similar to the first signal lines SLA1 through SLAn, since the signals applied to the second signal lines SLB1 through SLBn are sequentially inverted from the top of the display panel 110, the gate-off voltage that turns off the second switching device is input to the second switching device that connects the adjacent two second signal lines when the two second signal lines adjacent to each other receive the signals having different polarities.

Referring to FIG. 8, since the i-th first switching device CTAi connects the i-th first signal line SLAi and the (i+1)-th first signal line SLAi+1, the gate-off voltage that turns off the i-th first switching device CTAi may be input to the i-th first switching line CTLAi from the time the gate-on voltage is applied to the (i−1)-th gate line GLi-1 to the time the gate-on voltage is applied to an (i+1)-th gate line GLi+1.

Since the i-th second switching device CTBi connects the i-th second signal line SLBi and the (i+1)-th second signal line SLBi+1, the gate-off voltage that turns off the i-th second switching device CTBi may be input to the i-th second switching line CTLBi from the time the gate-on voltage is applied to the (i−1)-th gate line GLi-1 to the time the gate-on voltage is applied to the (i+1)-th gate line GLi+1.

However, a period during which the gate-off voltage is applied to the i-th first and second switching lines CTLAi and CTLBi may be different according to various embodiments.

Figure 9:
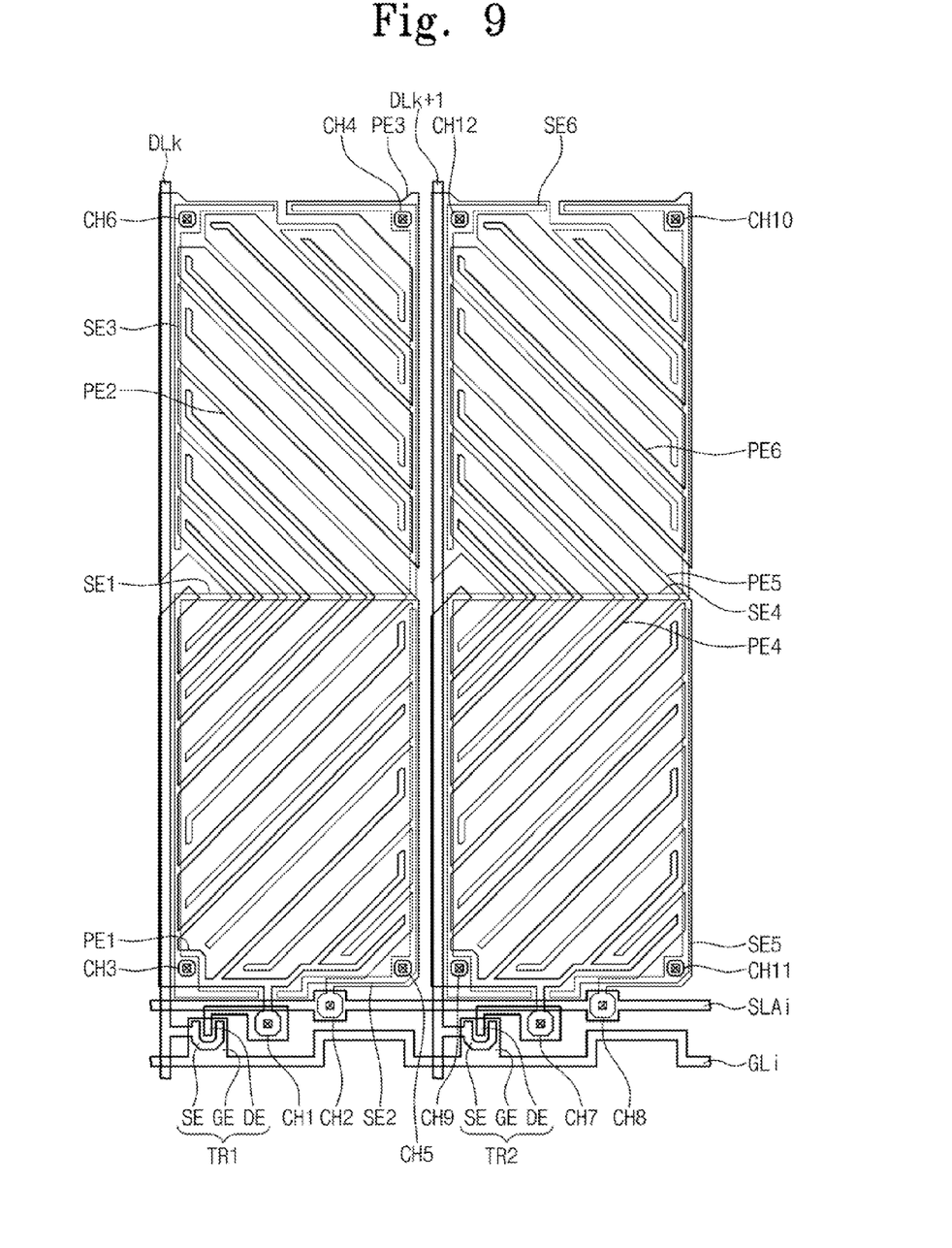
FIG. 9 is a plan view showing a display panel of FIG. 1 according to an exemplary embodiment of the present invention.
Figure 10:
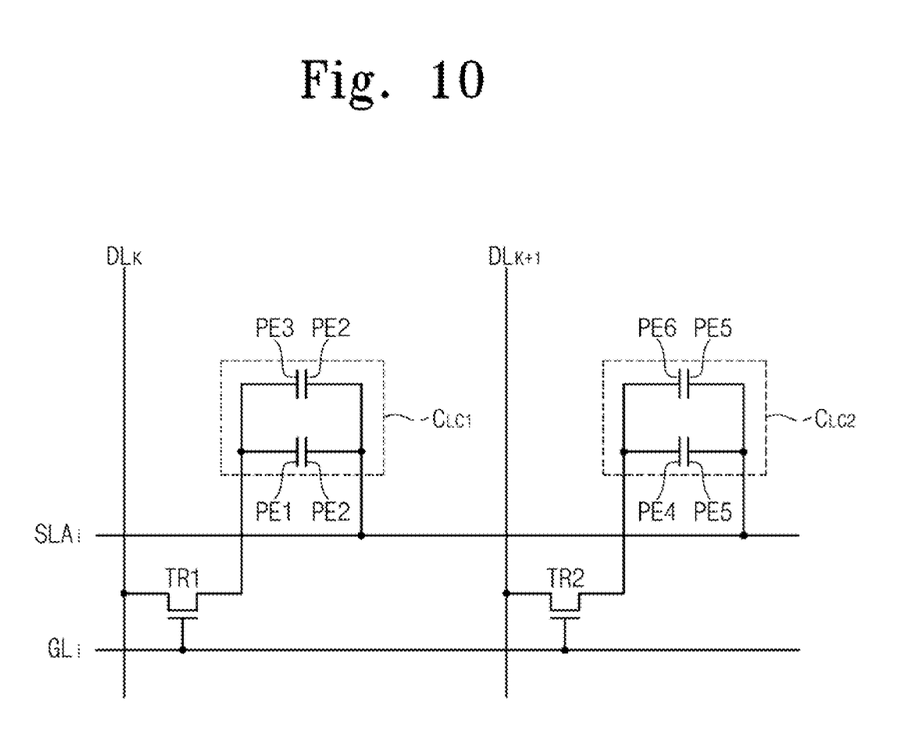
FIG. 10 is a circuit diagram corresponding to a display panel of FIG. 9.

FIG. 9 is a plan view showing the display panel of FIG. 1 according to an exemplary embodiment of the present invention and FIG. 10 is a circuit diagram corresponding to the display panel of FIG. 9. In FIGS. 9 and 10, the same reference numerals denote the same elements as in FIGS. 2 and 4, and thus the detailed descriptions of the same elements will be omitted. In addition, for the convenience of explanation, two pixel areas will be described in FIG. 9. The two pixel areas are repeatedly arranged in column and row directions in the display panel to achieve the desired number of pixel areas.

Referring to FIGS. 9 and 10, the display panel 110 includes the gate line GLi, the first and second data lines DLk and DLk+1, and the first signal line SLAi. Here, the display panel 110 does not include the second signal line SLBi unlike the display panel 110 described above with reference to FIGS. 2 and 4.

The first signal line SLAi is connected to the second pixel electrode PE2 through the second contact hole CH2 and the first signal line SLAi is connected to the fifth pixel electrode PE5 through the eighth contact hole CH8.

The first signal lines SLA1 through SLAn are extended in the second direction D2 and may alternatively receive the first voltage Vmax or the second voltage Vmin.

The signals applied to the signal lines shown in FIGS. 9 and 10 may be understood with reference to the timing diagram of FIG. 8.

Although exemplary embodiments of the present invention have been described above with reference to the drawings, it is understood that the present invention should not be limited to these exemplary embodiments but various changes and modifications can be made by one ordinary skilled in the art within the spirit and scope of the present disclosure.

What is claimed is:

1. A display panel comprising:
   a first substrate comprising a plurality of pixels each including a single liquid crystal capacitor all electrodes of which are disposed entirely within the first substrate;
   a second substrate facing the first substrate;
   a liquid crystal layer disposed between the first and second substrates;
   a plurality of first switching devices configured to connect two first signal lines adjacent to each other, respectively, in a direction in which a data line is extended; and
   a plurality of second switching devices configured to connect two second signal lines adjacent to each other, respectively, in the direction in which the data line is extended,
   wherein each of the plurality of pixels comprises:
   the data line;
   a gate line insulated from the data line over a region in which the gate line crosses the data line;
   a first signal line crossing the data line at a first side of the pixel, the first signal line insulated from the data line over a region in which the first signal line crosses the data line, the first signal line spaced apart from the gate line;
   a second signal line crossing the data line at a second side of the pixel, opposite to the first side of the pixel, the second signal line insulated from the data line over a region in which the second signal line crosses the data line, the second signal line spaced apart from the gate line and the first signal line;
   a switching device connected to the data line and the gate line;
   a first pixel electrode connected to the switching device; and
   a second pixel electrode connected to either the first signal line or the second signal line but not to both,
   wherein an image is displayed by the liquid crystal layer according to an electric field generated between the first and second pixel electrodes,
   wherein pixels of the plurality of pixels having the first pixel electrode connected to the first signal line are alternately arranged with pixels of the plurality of pixels having the second pixel electrode connected to the second signal line,
   wherein the pixels having the first pixel electrode and the pixels having the second pixel electrode are disposed in a same row, and
   wherein each of the first and second switching devices receives a gate-off voltage which turns off the first switching device from a period of time beginning before a gate-on voltage is input to two gate lines corresponding to the two first signal lines and ending after a gate-off voltage is input to the two gate lines corresponding to the two first signal lines.

2. The display panel of claim 1, wherein the second pixel electrodes of the pixels arranged in a single row are alternately connected to the first signal line and the second signal line.

3. The display panel of claim 1, wherein the second pixel electrodes of the pixels arranged in a single column are alternately connected to the first signal line and the second signal line.

4. The display panel of claim 1, wherein each of the first and second signal lines receives a signal having a polarity that is inverted at every frame with reference to a predetermined reference voltage, said signal being maintained at a constant voltage level, wherein the signal applied to the first signal line has a same voltage level as and a different polarity from the signal applied to the second signal line.

5. The display panel of claim 1, wherein each of the signals applied to the first signal line and the second signal line is maintained at a constant voltage level from a period of time beginning before a gate-on signal is input to the gate line to turn on the switching device and ending before a next gate-on signal is input to the gate line.

6. The display panel of claim 1, wherein one first switching device of the plurality of first switching devices connects two first signal lines included in two pixel rows adjacent to each other in the direction in which the data line is extended, and one second switching device of the plurality of second switching devices connects two second signal lines included in two pixel rows adjacent to each other in the direction in which the data line is extended.

7. The display panel of claim 6, wherein the first switching device connecting two first signal lines included in two pixel rows adjacent to each other in the direction in which the data line is extended receives a same signal as the second switching device connecting two second signal lines included in the two pixel rows adjacent to each other in the direction in which the data line is extended.

8. A display apparatus comprising:
a driving circuit receiving an external signal and generating an image signal and a control signal; and
a display panel including a plurality of pixels, each including a single liquid crystal capacitor all electrodes of which are disposed entirely within a first substrate, and receiving the image signal and the control signal, the display panel further including a plurality of first switching devices configured to connect two first signal lines adjacent to each other, respectively, in a direction in which a data line is extended, and a plurality of second switching devices configured to connect two second signal lines adjacent to each other, respectively, in the direction in which the data line is extended, wherein each of the plurality of pixels comprises:
the data line;
a gate line insulated from the data line over a region in which the gate line crosses the data line;
a first signal line crossing the data line at a first side of the pixel, the first signal line insulated from the data line over a region in which the first signal line crosses the data line, and the first signal line spaced apart from the gate line;
a second signal line crossing the data line at a second side of the pixel, opposite to the first side of the pixel, the second signal line insulated from the data line over a region in which the second signal line crosses the data line, and the second signal line spaced apart from the gate line and the first signal line;
a switching device connected to the data line and the gate line;
a first pixel electrode connected to the switching device; and
a second pixel electrode connected to either the first signal line or the second signal line but not to both,
wherein an image is displayed according to an electric field generated between the first electrode and the second electrode,
wherein pixels of the plurality of pixels having the first pixel electrode connected to the first signal line are alternately arranged with pixels of the plurality of pixels having the second pixel electrode connected to the second signal line,
wherein the pixels having the first pixel electrode and the pixels having the second pixel electrode are disposed in a same row, and
wherein each of the first and second switching devices receives a gate-off voltage which turns off the first switching device from a period of time beginning before a gate-on voltage is input to two gate lines corresponding to the two first signal lines and ending after a gate-off voltage is input to the two gate lines corresponding to the two first signal lines.

9. The display apparatus of claim 8, wherein the second pixel electrodes of the pixels arranged in a single row are alternately connected to the first signal line and the second signal line.

10. The display apparatus of claim 8, wherein the second pixel electrodes of the pixels arranged in a single column are alternately connected to the first signal line and the second signal line.

11. The display apparatus of claim 8, wherein each of the first and second signal lines receives a signal having a polarity that is inverted at every frame with reference to a predetermined voltage, said signal being maintained at a constant voltage level, wherein the signal applied to the first signal line has a same voltage level as and a different polarity from the signal applied to the second signal line.

12. The display apparatus of claim 8, wherein each of the signals applied to the first signal line and the second signal line is maintained at a constant voltage level from a period of time beginning before a gate-on signal is input to the gate line to turn on the switching device and ending before a next gate-on signal is input to the gate line.

13. The display apparatus of claim 8, wherein one first switching device of the plurality of first switching devices connects two first signal lines included in two pixel rows adjacent to each other in the direction in which the data line is extended, and one second switching device of the plurality of second switching devices connects two second signal lines included in two pixel rows adjacent to each other in the direction in which the data line is extended.

14. The display apparatus of claim 13, wherein the first switching device connecting two first signal lines included in two pixel rows adjacent to each other in the direction in which the data line is extended receives a same signal as the second switching device connecting two second signal lines included in the two pixel rows adjacent to each other in the direction in which the data line is extended.

15. A display panel comprising:
a single substrate comprising a plurality of pixels disposed entirely thereon, each pixel of the plurality of pixels including a single liquid crystal capacitor all electrodes of which are disposed entirely within a first substrate;
a plurality of first switching devices configured to connect two first signal lines adjacent to each other, respectively, in a direction in which a data line is extended; and
a plurality of second switching devices configured to connect two second signal lines adjacent to each other, respectively, in the direction in which the data line is extended,
wherein each of the plurality of pixels comprises:
the data line;
a gate line crossing the data line and insulated from the data line;
a first signal line crossing the data line at a first side of the pixel, the first signal line insulated from the data line, and spaced apart from the gate line;
a second signal line crossing the data line at a second side of the pixel, opposite to the first side of the pixel, the second signal line insulated from the data line, and spaced apart from the gate line;
a switching device connected to the data line and the gate line;
a first pixel electrode connected to the switching device; and a second pixel electrode connected to either the first signal line or the second signal line but not to both, wherein an image is displayed according to an electric field generated between the first and second pixel electrodes, wherein pixels of the plurality of pixels having the first pixel electrode connected to the first signal line are alternately arranged with pixels of the plurality of pixels having the second pixel electrode connected to the second signal line, wherein the pixels having the first pixel electrode and the pixels having the second pixel electrode are disposed in a same row, and wherein each of the first and second switching devices receives a gate-off voltage which turns off the first switching device from a period of time beginning before a gate-on voltage is input to two gate lines corresponding to the two first signal lines and ending after a gate-off voltage is input to the two gate lines corresponding to the two first signal lines.

16. The display panel of claim 15, wherein the signal line receives a signal having a polarity that is inverted at every frame with reference to a predetermined reference voltage, said signal being maintained at a constant voltage level.

17. The display panel of claim 16, wherein the signal applied to the signal line is maintained at a constant voltage level from a period of time beginning before a gate-on signal is input to the gate line to turn on the switching device and ending before a next gate-on signal is input to the gate line.

18. A display panel comprising:
a first substrate;
a second substrate;
a liquid crystal layer disposed between the first substrate and the second substrate;
a plurality of first switching devices configured to connect two first signal lines adjacent to each other, respectively, in a direction in which a data line is extended;
a plurality of second switching devices configured to connect two second signal lines adjacent to each other, respectively, in the direction in which the data line is extended;
a plurality of first pixel electrodes on the first substrate, each including a single liquid crystal capacitor all electrodes of which are disposed entirely within a first substrate; and
a plurality of second pixel electrodes, corresponding to the plurality of first pixel electrodes, also disposed on the first substrate, wherein a pixel displaying a portion of an image using the liquid crystal layer is formed at each corresponding first and second electrodes, said pixel comprising:

data line;
a gate line crossing the data line and insulated from the data line;
a first signal line, crossing the data line at a first side of the pixel, the first signal line insulated from the data line, and spaced apart from the gate line;
a second signal line, crossing the data line at a second side of the pixel, opposite to the first side of the pixel, the second signal line insulated from the data line, and spaced apart from the gate line; and
a switching device connected to the data line and the gate line, wherein pixels of the plurality of pixels having the first pixel electrode connected to the first signal line but not the second signal line are alternately arranged with pixels of the plurality of pixels having the second pixel electrode connected to the second signal line but not the first signal line, wherein the pixels having the first pixel electrode and the pixels having the second pixel electrode are disposed in a same row, and wherein each of the first and second switching devices receives a gate-off voltage which turns off the first switching device from a period of time beginning before a gate-on voltage is input to two gate lines corresponding to the two first signal lines and ending after a gate-off voltage is input to the two gate lines corresponding to the two first signal lines.

\* \* \* \* \*